US007513483B1

(12) United States Patent
Blume

(10) Patent No.: US 7,513,483 B1
(45) Date of Patent: Apr. 7, 2009

(54) VALVE BODY AND SEAL ASSEMBLY

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 217 days.

(21) Appl. No.: 11/219,261

(22) Filed: Sep. 2, 2005

Related U.S. Application Data

(63) Continuation-in-part of application No. 10/179,804, filed on Jun. 25, 2002, now Pat. No. 6,955,181.

(51) Int. Cl.
F16K 1/00 (2006.01)
F16K 15/00 (2006.01)
(52) U.S. Cl. .................... 251/332; 251/333; 137/516.29
(58) Field of Classification Search ................. 251/318, 251/332, 333, 358; 137/516.29
See application file for complete search history.

(56) References Cited

U.S. PATENT DOCUMENTS

| 4,307,140 | A | * | 12/1981 | Davis | 428/86 |
| 4,340,084 | A | * | 7/1982 | Snow | 137/512 |
| 4,518,329 | A | * | 5/1985 | Weaver | 417/566 |
| 4,676,481 | A | * | 6/1987 | Hayes | 251/173 |
| 4,842,287 | A | * | 6/1989 | Weeks | 277/641 |
| 5,052,435 | A | * | 10/1991 | Crudup et al. | 137/516.29 |
| 5,088,521 | A | * | 2/1992 | Johnson | 137/516.29 |
| 6,189,894 | B1 | * | 2/2001 | Wheeler | 277/549 |
| 6,206,376 | B1 | * | 3/2001 | Hartman et al. | 277/314 |

* cited by examiner

Primary Examiner—John K Fristoe, Jr.
(74) Attorney, Agent, or Firm—Dennis W. Gilstad

(57) ABSTRACT

A valve body and seal assembly comprising a valve body having one or more peripheral integral seal retention grooves and one or more peripheral single-durometer and/or dual-durometer elastomeric seals, each seal being cast-in-place in an integral seal retention groove having adhesion-inhibiting surfaces and offset circular serrations of predetermined height on opposing groove walls. Adhesion-inhibiting surfaces reduce or eliminate internal elastomer stress due to curing of cast-in-place elastomeric seals. Serrations on each of the opposing groove walls are offset to accommodate differing stress concentrations in the walls. Opposing groove walls diverge peripherally. Offset serrations result in decreased metal fatigue from impact and bending stress. Offset serrations also improve valve sealing and increase valve service life by maintaining correct seal position on the valve body while minimizing background stress in the seal elastomer(s). Valve service life is also increased by appropriate choice of differing elastomer compositions for dual-durometer seals.

7 Claims, 8 Drawing Sheets

VALVE BODY AND SEAL ASSEMBLY

This is a continuation-in-part (CIP) patent application of U.S. Ser. No. 10/179,804, which was filed Jun. 25, 2002 now U.S. Pat. No. 6,955,181.

FIELD OF THE INVENTION

The present invention relates generally to valves suitable for rapid open-close cycling with abrasive fluids, such as drilling mud, under high pressures. More specifically, the invention relates to valves comprising an elastomeric seal in a peripheral seal retention groove on the moving element of the valve.

BACKGROUND OF THE INVENTION

Valve terminology varies according to the industry (e.g., pipeline or oil field service) in which the valve is used. In some applications, the term "valve" means just the moving element, whereas in other applications, the term "valve" includes the moving element, the valve seat, and the housing that contains the moving element and the valve seat. To clarify the following description of the present invention, a valve suitable for abrasive fluids, such as oil field drilling mud, comprises a valve body (the moving element) and a corresponding valve seat.

The valve body incorporates an elastomeric seal within a peripheral seal retention groove. These valves are usually mounted in the fluid end of a high-speed pump incorporating positive displacement pistons or plungers in multiple cylinders. Such valves are frequently web-seat, stem-guided designs or full open seat designs adapted for high pressures and repetitive impact loading of the valve body and valve seat. Both leakage and premature failure due to metal fatigue must be overcome in designing these valves, and special attention is focused on the moving element (or valve body).

The valve body element typically comprises at least one groove for a peripheral elastomeric seal. If preformed seals are to be used, such a groove requires finish machining to closely match the dimensions of seals like the "snap-on" type or seals secured with a removable seal retention plate. This finish machining may be reduced or eliminated if elastomeric seals are cast and cured in place (herein "cast-in-place") in their groove. Further, cast-in-place seals may be mechanically locked to a valve element by forming them over interengaging or interlocking (herein "interdigitating") projecting-receiving formations on the element. Such interdigitating of valve element and seal has become a recommended structural feature of cast-in-place seals that was evidently difficult or impossible to achieve with "snap-on" type seals. See, for example, the entire U.S. Pat. No. 4,860,995 (incorporated herein by reference), particularly col. 7, lines 17-57.

But manufacture of valve elements with interdigitating cast-in-place seals, such as those described in the '995 patent has historically involved added costs. These added costs arose because, as described in the '995 patent, the seals are preferably bonded to a valve element to increase its overall integrity. See the '995 patent, col 7, lines 47-50.

Even though the manufacturing cost of valve bodies for bonded cast-in-place seals is almost identical to the analogous cost of valve bodies for "snap-on" seals, the added cost of preparing the valve body for bonding increases the cost of the valve to the point that these valves have not been competitive on price. The added costs of bonding include cleaning the valve groove of all oil and contaminants, applying a bonding adhesive, and storing the valves in a low-humidity, dust-free environment while the valves await casting, bonding, and curing of the urethane on the valve body.

Despite their added cost and, as noted in the Detailed Description herein, their unexpectedly short service life, bonded cast-in-place seals have achieved limited acceptance on valve bodies having circular "Channel-Beam" sections or other one-piece valve bodies. Channel-Beam valve bodies are characterized by a forged bowl shape as seen, for example, in FIG. 1 of U.S. Pat. No. 5,249,600 (the entire '600 patent is incorporated herein by reference). The acceptance of bonded cast-in-place seals in these applications, notwithstanding their relatively high cost and shortened service life, may be attributed in part to the benefits of the Channel-Beam design itself and in part to the problems of using "snap-on" type seals on this type of valve body.

Forged Channel-Beam valve bodies such as those in the '600 patent have exceptional stiffness, strength, and resistance to fatigue failure. But, in addition to the above problems with bonded cast-in-place seals, they also have several disadvantages when used with "snap-on seals. First, rough valve body forgings in the Channel-Beam shape require substantial material removal for finish machining of the integral seal retention groove if a "snap-on" seal is to fit properly. Second, even if an accurately preformed elastomeric seal in the shape of a toroidal ring is snapped into a carefully machined seal retention groove, it may not fully seat within the groove due to stack-up (i.e., additive effects) of manufacturing tolerances. The resulting out-of-round seal condition can cause early valve failure. Similar disadvantages are also seen in other Channel-Beam designs, such as those described in U.S. Pat. Nos. 3,191,617; 3,202,178; 3,742,976; 4,180,097; 5,345,965; and 5,431,186, all incorporated herein by reference.

Thus, notwithstanding their relatively high cost and/or problems with limited service life, valve bodies having "snap-on" or cast-in-place seals in a seal retention groove analogous to the one-piece Channel-Beam design have gained limited industry acceptance. Although the seals have been problematical, the strength and stiffness of the Channel-Beam shape tend to reduce valve body distortion about one or more radial axes (i.e., axes radiating perpendicularly from the valve body's longitudinal axis of symmetry). This type of distortion is associated with both leaks and fatigue failures, and it is particularly likely to occur on valve bodies mating with web seats.

Metal fatigue is induced when cyclical high pressure is applied to a valve body sealed against, and being distorted by, a web seat. The pressure tends to repeatedly force the disc-shaped area of the valve body (i.e., the flange) into the spaces between the seat webs. This distortion, plus impact loads secondary to valve closure and bending moments caused by pressure on the valve seal, causes non-uniform stresses in the flange, particularly in the two opposing walls of the flange's peripheral seal retention groove.

For example, the groove wall closest to the valve seat typically sustains relatively high impact load stress transmitted through a peripheral metal sealing surface (i.e., a valve body impact area) for contacting the seat when the valve closes. This area of the flange, then, tends to be particularly susceptible to peripheral metal fatigue failures. In contrast, the flange area comprising the opposite groove wall tends to be bent longitudinally through force exerted by the seal within the groove when the seal is displaced as the valve fully closes. This bending stress is minimal peripherally and greatest in that part of the wall nearest the valve body's longitudinal axis of symmetry, that is, the central part of the wall (i.e., that part of the wall nearest the base of the groove).

Peripheral flange stresses (and the associated fatigue failures) may be reduced to a limited extent, and valve sealing improved, by a properly-placed peripheral elastomeric seal which contacts the valve seat on closure. Improper placement of this seal, however, leads to an out-of-round condition that may actually increase leaks and hasten valve failure. Leaks may occur, for example, past an out-of-round "snap-on" seal or around a cast-in-place seal that shifts during use within its seal retention groove.

The potential advantages of an elastomeric seal insert (including extended valve service life and improved valve performance) are commonly reduced or lost entirely if the seal is poorly fitted to the valve body or if the seal shifts in its retention groove during use. Both of these conditions allow leaking high-pressure fluid to jet through one or more leak paths. If the valve remains in service, each jet of high-pressure fluid will literally wash away a portion of the hardened steel of the valve body and/or seat. Multiple and near-simultaneous failures of this kind may give a valve body flange the appearance of a wrinkled cupcake paper.

Further, leaks due to displacement of cast-in-place elastomeric seals often occur secondary to failure of the elastomer adjacent to the special adhesive that bonds the seal to the groove. If a portion of the seal is tightly bonded to the groove wall, background stress within the seal elastomer will increase as the elastomer cures because the seal as a whole tends to shrink away from the walls to which it is bonded. Deleterious effects of this background elastomer stress (i.e., elastomer stress that is present even when the seal is not in contact with a valve seat) may be significantly aggravated when a valve body closes against its seat. The resulting elevated internal elastomer stress tends to reduce the service life of the seal by predisposing it to cracking, tearing and/or extrusion. FIG. 1A schematically illustrates an example of such stress-induced tearing in an elastomeric seal on a valve body shaped similarly to that in FIG. 2 of the '995 patent.

By including a schematic representation of a valve seat, FIG. 1A also shows the proximity of a stress-induced tear with the portion of an elastomeric seal that would be subject to extrusion stress as the valve body mates with the valve seat. The requirement that a valve seal make contact with the valve seat prior to metal-to-metal contact between the valve body and seat means that the seal elastomer is subjected to strong compressive forces as the valve is closing. Since movement of the seal against the valve seat is restricted by friction, by the metal portion of the valve body, and by the valve seat itself, a portion of the seal elastomer tends to be extruded into the (schematically shown) extrusion gap. Thus a portion of the seal tends to be repeatedly deformed by this extrusion process each time the valve closes. Elastomer stress due to this deformation can thereby add to the background elastomer stress noted above to precipitate premature failures like the illustrated tear. On the other hand, reductions in background elastomer stress can reduce overall elastomer stress during valve closing, thereby lengthening the service life of the seal.

To avoid the extra cost of adhesive and the induced background elastomer stress associated with curing of cast-in-place adhesively-bonded seals, a deformable seal may be stabilized in a groove by threaded serrations directly opposing each other on the sides of a seal retention groove. Stabilization of this general type is termed mechanical locking in the '995 patent. Serrations for this purpose are illustrated in U.S. Pat. Re. Nos. 29,299 and 4,676,481 (both patents incorporated herein by reference). While effective for limiting seal movement within the groove, serrations arranged in this manner can themselves raise stress in both the groove walls and the elastomer. And any unnecessary increases in stress will predispose the elastomer seal to premature failure.

Premature stress-induced failures, however, would be relatively rare in the valves illustrated and described in the '299 and '481 patents. These are pipeline valves that are intended for applications with a maximum total valve service life of about 1000 open-close cycles. In contrast, stem-guided valves of web-seat or open seat design that are suitable for drilling mud commonly operate at relatively high pressures and complete two open-close cycles per second. Service life for these valves is measured in millions of cycles (commonly about 1 to 10 million open-close cycles). Incipient valve body fatigue failures that are not manifest after only 1000 open-close cycles become a significant maintenance problem in a valve experiencing millions of cycles during its expected service life.

For the latter valves, a more robust seal assembly is needed, comprising an elastomeric seal that is cast-in-place on a valve body having an integral seal retention groove. Use of a separate adhesive for bonding the seal within the groove, although taught in the '995 patent, should in fact be avoided to reduce background stress in the cured seal elastomer. Further, serrations to retain the seal in the groove should be placed to minimize their effects as stress raisers for the valve body, with consideration being given to the different stress distributions in the opposing groove walls.

Such serration placement would minimize valve body fatigue failures due to impact loads and bending stress. Further, serrations should be designed so the seal elastomer can retain effective contact with the serrations on the groove walls while it is being cured. Such continued effective contact (i.e., interdigitation) would ensure that, notwithstanding shrinkage of the elastomer during curing, the seal could be retained in its groove without suffering displacement that would materially reduce its service life.

SUMMARY OF THE INVENTION

The present invention relates to elastomeric seals, each seal being cast-in-place in a mold comprising a peripheral seal retention groove of a valve body that comprises at least one such groove. Unlike earlier cast-in-place seals, however, seals of the present invention exhibit unexpectedly long service life because of their unique structure and because they avoid the errors of earlier teachings such as those related to bonding of seal materials to valve elements in the '995 patent.

An illustrated embodiment of the present invention is a valve body and seal assembly having a longitudinal axis of symmetry and comprising a peripheral seal retention groove spaced apart from the longitudinal axis. The seal retention groove has first and second opposing sides (i.e., groove walls). A valve body impact area for contacting a valve seat is peripherally located on the first opposing groove wall of the peripheral seal retention groove, and circular serrations are located on the first and second opposing groove walls of the peripheral seal retention groove.

An elastomeric seal is cast-in-place in the peripheral seal retention groove, the elastomeric seal comprising a first seal section and a second seal section. The first seal section comprises a peripheral frusto-conical surface for contacting a valve seat, the frusto-conical surface being adjacent to the valve body impact area. And the first seal section comprises relatively high modulus polyurethane. The second seal section comprises a peripheral surface adjacent to the peripheral frusto-conical surface, at least a portion of the second seal section comprising polyurethane having a lower modulus than the relatively high modulus polyurethane.

Thus, certain embodiments of the invention include cast-in-place dual-durometer elastomeric seals wherein the first seal section is relatively harder (typically with a Shore A durometer rating of about 95) than the second seal section (typically with a Shore A durometer rating of about 75 to about 85). Since its peripheral frusto-conical surface is subject to extrusion as it contacts a valve seat, the first seal section is made more extrusion-resistant than the second seal section. This is required because of the importance of controlling or limiting extrusion damage for extending the service life of such peripheral valve body seals. In these applications, MDI polyester thermoset urethanes (comprising a monodiphenylethane polymer and about 14-16% of a diisocyanate curative) have been shown to have excellent extrusion resistance, as well as excellent abrasion resistance, at a Shore A durometer hardness of 95.

On the other hand, since the relatively harder elastomers suitable for the first seal section typically exhibit relatively little shape memory to accommodate minor irregularities in a valve seat, elastomer for the second seal section is chosen to exhibit relatively greater shape memory. The resulting cast-in-place dual-durometer seal has a combination of desirable properties that would be difficult to achieve in a single snap-on seal, in part because the distortion associated with installation of a snap-on seal would tend to separate the two seal sections and would predispose these two sections to misalignment and/or an out-of-round condition of the installed seal.

Mold surfaces coming into contact with the elastomer(s) as a seal of the present invention is cast-in-place are chosen and/or prepared so as to inhibit adhesion of the elastomer to each such surface, rather than to encourage the bonding taught in the '995 patent. Adhesion-inhibiting properties of a mold-elastomer interface may be obtained by appropriate choice of materials for the mold and the elastomer, and/or by subsequent treatment of these materials. For example, if a valve body is quenched in oil after heat-treatment (e.g., carburization), a thin layer of the quenching oil may be retained on the seal retention groove after quenching is completed for treating the groove to increase its adhesion-inhibiting properties. An adhesion-inhibiting seal retention groove may also be prepared, for example, by polishing the groove and/or by the applying to the groove one or more layers of non-stick materials such as oils, greases, waxes or plastics having properties similar to Teflon®. In each case, according to the present invention, an elastomeric seal cast-in-place in contact with adhesion-inhibiting surfaces preferably exhibits minimal or no adherence to such surfaces during curing. That is, forces due to adhesion of the elastomer to mold surfaces, if present, will not materially add to the elastomer's background stress and thus will not materially reduce service life through a mechanism similar to that schematically illustrated in FIG. 1A.

Embodiments of valve bodies having one or more peripheral seal retention grooves (as, for example, a stem-guided valve body for use with a web seat or open seat) are symmetrical about a longitudinal axis. They are relatively stiff for their weight, and do not employ any means such as a seal retention plate for applying longitudinal compressive forces to a seal in the groove. They resist distortion about radial axes better than valve bodies of equal weight having seal retention plates, and they avoid imposition of background stress on an elastomeric seal in the groove that could result from longitudinal compressive forces applied to the seal by a seal retention plate.

Valve bodies of the present invention comprise offset circular serrations of predetermined height on first and second opposing walls of an integral seal retention groove that is spaced apart from the valve body longitudinal axis. Offset serrations (or groups of serrations) on the first and second opposing walls are located at different distances from the longitudinal axis. Where a plurality of serrations are grouped on one or both of the opposing groove walls, distance from the longitudinal axis attributed to a serration group is the mean distance from the longitudinal axis for serrations within that group.

First opposing walls of the insert seal retention grooves on valve bodies of the present invention are closer than second opposing walls to an area of high impact loads because they are closer to a peripheral metal sealing surface (valve body impact area) on the valve body flange. Thus, the periphery of first opposing walls is subject to relatively higher impact stress than other parts of the opposing groove walls when the valve body strikes the valve seat.

Second opposing walls, while more distant from the site of maximum metal-to-metal impact stress than first opposing walls, nevertheless experience significant bending stress due to forces transmitted to them through the seal. This bending stress on the second opposing groove wall is lowest peripherally and highest centrally (i.e., highest in that part of the wall that is closest to the longitudinal axis of the valve body). The area of maximum bending stress on second opposing groove walls is more central than the area of maximum metal-to-metal impact stress on first opposing walls because second opposing walls are effectively cantilevered peripherally from the most centrally located area of the seal retention groove.

Because the periphery of first opposing walls sustains relatively high impact stress, serrations on first opposing walls are preferably located as far centrally on such groove walls as practicable to maximize the distance from the impact area and thus minimize stress build-up near the serrations (which act as stress raisers). In a stem-guided valve body having a longitudinal axis of symmetry, for example, this means that serrations on first opposing walls are located as close as practicable to the longitudinal axis of symmetry (i.e., relatively centrally in the seal retention groove).

On the other hand, the bending stress acting on the second opposing wall of an integral seal retention groove on a stem-guided valve body will typically be greatest near the portion of the second opposing wall nearest the longitudinal axis of symmetry. Hence, for the stem-guided valve bodies of the present invention, serrations on second opposing walls are located as far as practicable from the longitudinal axis of symmetry (i.e., peripherally, relative to the centrally-placed serrations on the first opposing walls as noted above).

Serrations (or serration groups) on first and second groove walls are therefore offset. Serration offset, in turn, minimizes the detrimental stress-raising effects of the serrations on their respective valve body flange areas. Additionally, use of offset serrations means that retaining forces exerted on an elastomeric seal in a groove by serrations on the opposing groove walls are further spaced apart as a function of the offset distance. This further spacing apart adds to the separation of forces acting on the seal and thus reduces stress concentration in the seal elastomer that would tend to tear the seal apart. Reduced stress concentration, in turn, results in reduced elastomer stress for seals in the present invention compared with seals illustrated in the '299 and '481 patents (where serrations are not offset but instead are directly opposite each other).

Thus, the offset serrations in a seal retention groove of the present invention act to reduce the likelihood of fatigue failures in valve body flanges, and they simultaneously reduce stress concentration in the elastomer of a seal in the groove. The latter benefit may be further increased if spacing between the respective flange areas that form the opposing walls of a peripheral seal retention groove increases as a function of increasing distance from the valve body longitudinal axis. Spacing between seal retention groove walls is determined in part by industry standards but may preferably be increased in valve bodies of the present invention to obtain additional elastomer stress relief. For this reason, the parallel seal retention groove walls illustrated in the '299 and '481 patents are less preferred than groove walls which diverge peripherally.

For many embodiments of the present invention, the desired peripheral divergence of seal retention groove walls is already inherent in industry standards. For example, valve bodies intended to be used as replacements for another valve body previously used with a TRW Mission 4-web seat must match analogous dimensions on the previously-used valve body. On the other hand, internal dimensions such as the degree of divergence of the opposing groove walls (reflecting the groove width at each point) can to some extent be uniquely specified.

In preferred embodiments of the present invention, seal retention groove width increases as a function of increasing distance from the valve body longitudinal axis. The amount of groove width increase at each point is sufficient to allow escape for air bubbles that may be present during casting of an elastomeric seal in a mold comprising the groove when the longitudinal axis is in the preferred (vertical) orientation. A desirable amount of groove width increase with increasing distance from the valve body longitudinal axis may be specified in terms of the included angle measured between straight (or nearly straight) portions of seal retention groove walls. The preferred range of these included angles for the present invention is about 10 to 60 degrees, depending on the particular valve body design.

Note that curvature of groove walls toward the center of the groove is allowable if the resulting curved wall would not trap air bubbles in liquid elastomer when the valve body is in position for casting of a seal in the groove. Included angle measurements for any curved portion of the groove wall are preferably made using the chord of any such curved portion.

DETAILED DESCRIPTION OF PREFERRED EMBODIMENTS

Figure 1A:
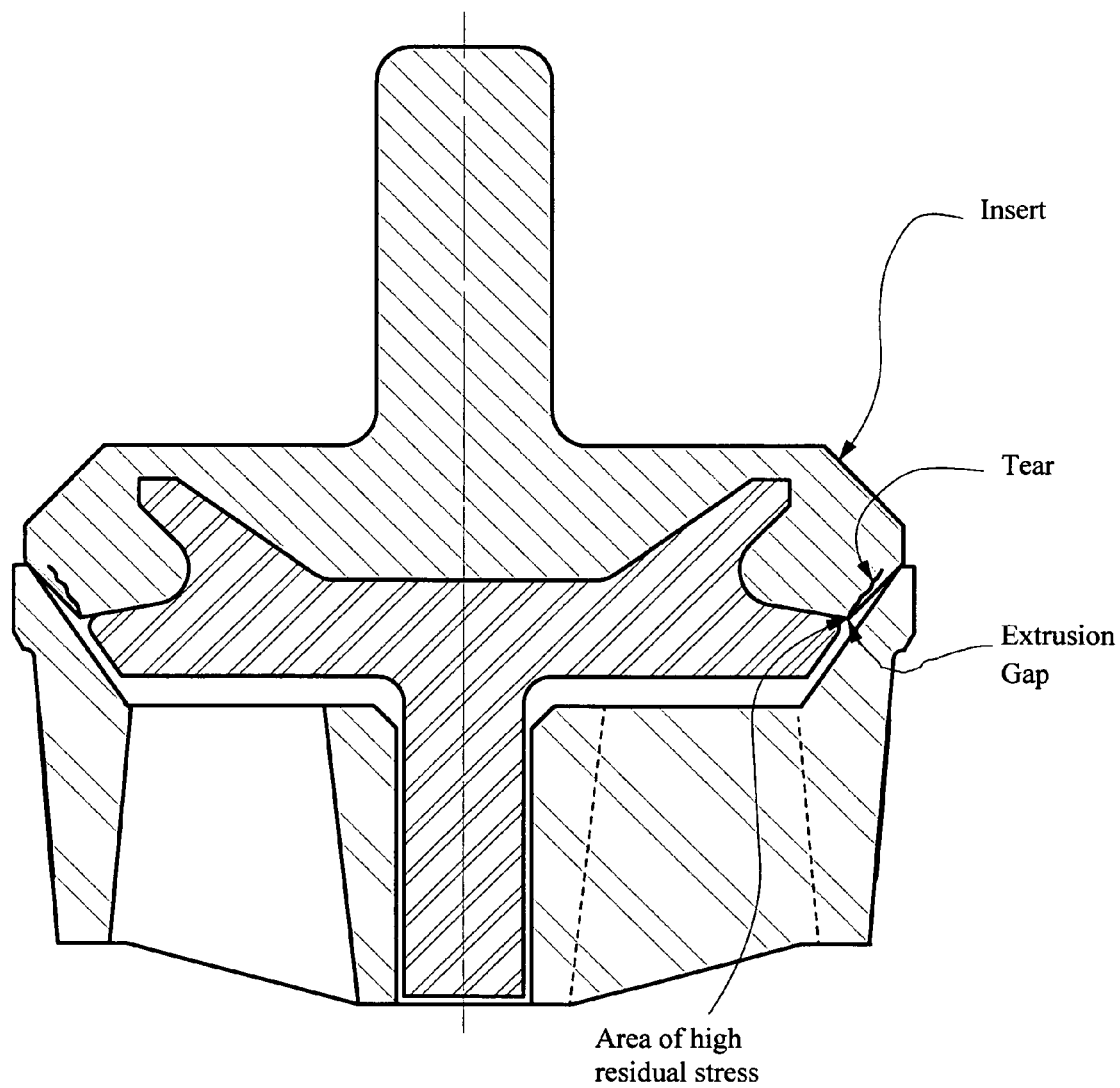
FIG. 1A schematically illustrates areas of typical failure modes of cast-in-place elastomeric seals that are bonded on a valve body.
Figure 2:
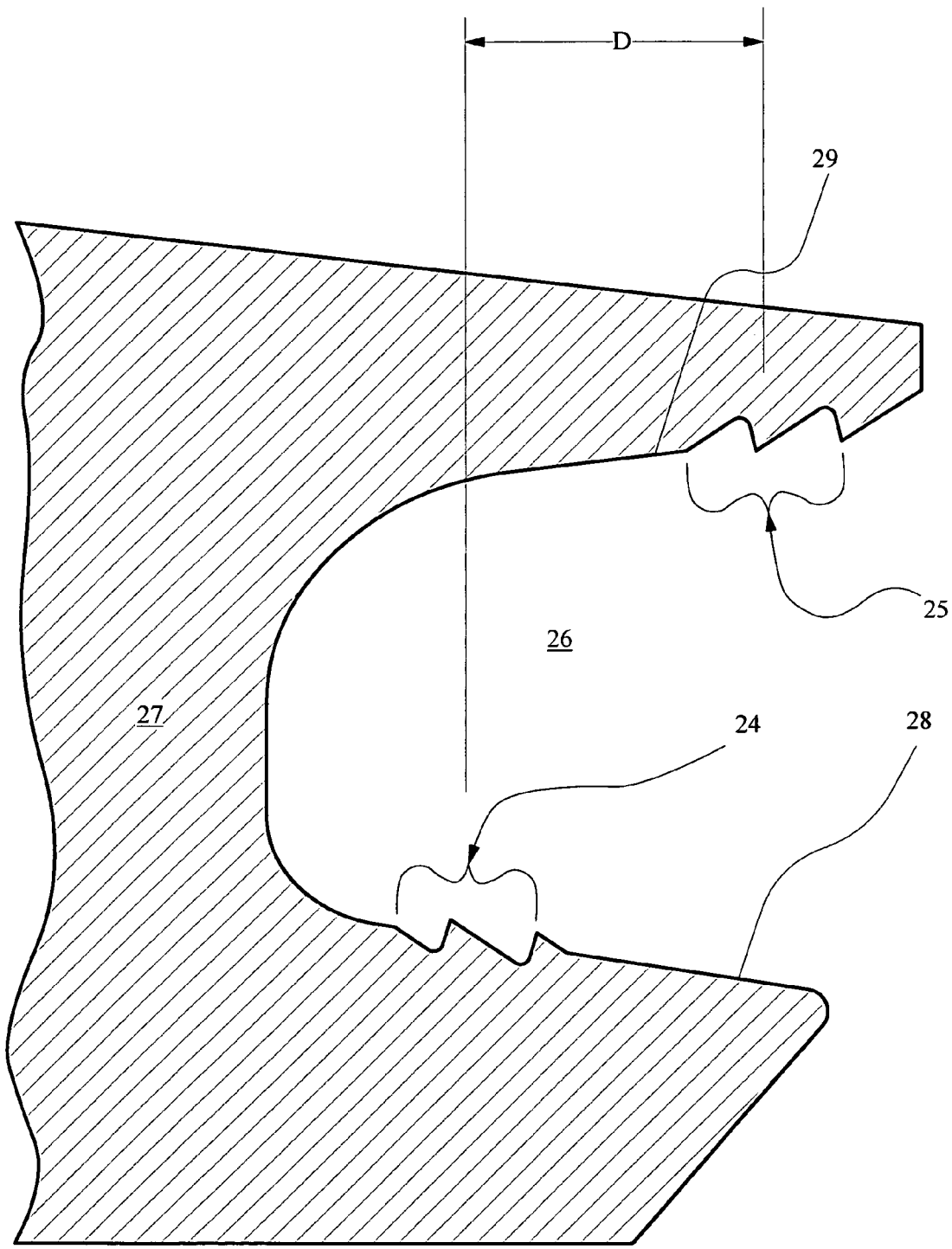
FIG. 2 schematically illustrates an enlarged partial cross-section of the valve body of FIG. 1B comprising a peripheral integral seal retention groove having offset serrations and adhesion-inhibiting surfaces.

FIG. 1A indicates typical areas of high elastomer stress and associated premature seal failure expected in bonded seals on valve bodies like that in FIG. 2 of the '995 patent. Note that the '995 patent does not discuss seal failure due to high elastomer stress at all. On the contrary, by describing increased overall valve element integrity associated with the bonding of valve seal inserts to a valve body, the '995 patent teaches away from the adhesion-inhibiting structures and functions of the present invention.

In so teaching, the '995 patent simply reinforces the past failure of valve manufacturers to appreciate the important effects of seal elastomer background stress on valve durability. Until the present invention, the problem of elevated background elastomer stress in bonded seals was neither recognized nor effectively addressed. Indeed, the problem was actually compounded by the widespread industry practices reflected in the teachings of the '995 patent.

In contrast, the present invention provides means to reduce background elastomer stress and reduce its deleterious effects. As described in the Background above, internal tears in elastomeric valve seal inserts like those schematically illustrated in FIG. 1A are precipitated by the repeated stress of valve closing and opening on the seal. In the past, bonding of cast-in-place seals unexpectedly hastened the occurrence of the tears. Valve service life was thereby shortened, but the seal failure mechanism (i.e., the presence of unnecessarily high background elastomer stress) was not understood. Indeed, although the invention of the '995 patent reflects about fifteen years of accumulated industry experience with bonded urethane seal valves, the deleterious effects of background elastomer stress due to bonding is neither recognized nor addressed in the '995 patent. Thus the long-felt need for improved durability of valves having cast-in-place elastomeric seals remained unmet after issuance of the '995 patent. And this need remained unmet until the present invention refuted the teaching of the '995 patent that encouraged bonding of cast-in-place seals to a valve body. The unexpected teaching of the present invention is that such bonding should be inhibited rather than encouraged, and means are described herein to achieve the desired adhesion inhibition.

The provision of adhesion-inhibiting surfaces in molds for cast-in-place elastomeric valve seals is therefore a distinguishing feature of the present invention that results in materially improved seal performance with conventional seal elastomers. For example, although the MDI polyester thermoset urethanes are well known seal materials, the present invention includes new and non-obvious ways to use these materials. Elastomeric valve seals cast-in-place on valve bodies according to the present invention differ materially from prior cast-in-place valve seals due to the inhibition of bonding or adhesion between the elastomer and the valve body, resulting in materially lower levels of background stress in the cured elastomer seal. Hence, valve seal assemblies comprising valve bodies and cast-in-place seals made by the new methods are also part of the present invention.

Figure 1B:
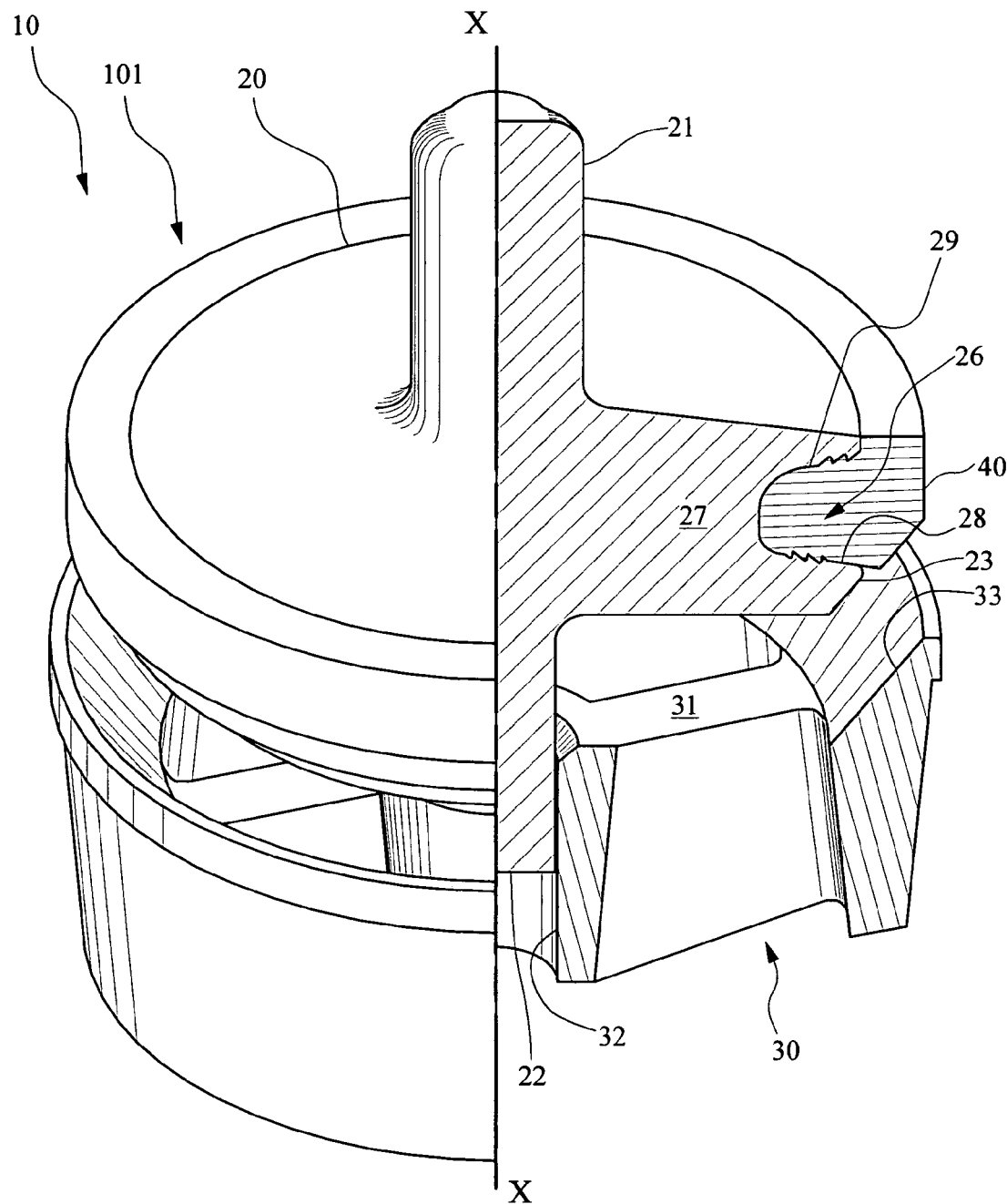
FIG. 1B schematically illustrates a partial cross-section of a web-seat, stem-guided valve comprising a valve seat with a valve body and seal assembly.

FIG. 1B schematically illustrates a web-seat, stem-guided valve 10 comprising a valve seat 30 with a valve body and seal assembly 101. Valve seat 30 comprises sealing surface 33 connected to stem guide 32 by a plurality of webs 31. Valve body and seal assembly 101 comprises a stem-guided valve body 20, and an elastomeric seal 40 in a peripheral integral seal retention groove 26. Valve body 20 comprises guide stem 21 and guide stem 22, guide stem 22 lying within stem guide 32 of valve seat 30. Valve body 20 also comprises flange 27, which in turn comprises first and second groove walls 28 and 29 respectively of peripheral integral seal retention groove 26. First groove wall 28 is near peripheral metal sealing surface 23 (valve body impact area) of valve body 20. When valve 10 closes, sealing surface 23 of valve body 20 strikes sealing surface 33 of web seat 30, causing relatively high impact stress in sealing surface 23 and adjacent areas of the periphery of first seal retention groove wall 28.

Figure 1C:
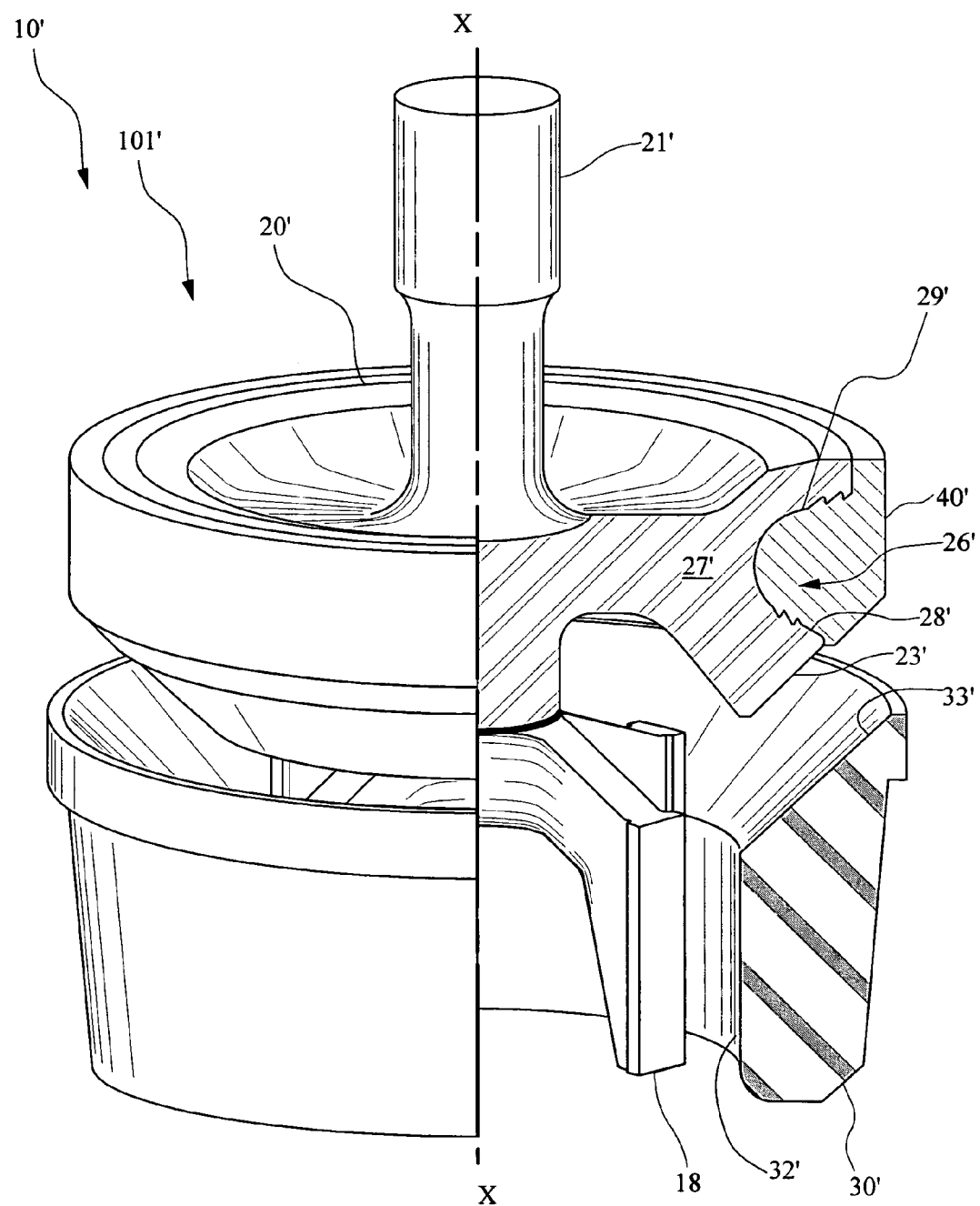
FIG. 1C schematically illustrates a partial cross-section of an open-seat, stem-guided valve comprising a valve seat with a valve body and seal assembly.

FIG. 1C schematically illustrates an open-seat, stem-guided valve 10' analogous to the web-seat, stem-guided valve 10 of FIG. 1B. Valve 10' in FIG. 1C comprises several structural features (and groups of structural features) labeled with primed numerals because they are analogous to structural features having the same numeral label in FIG. 1B. For example, valve 10' comprises a valve seat 30' with a valve body and seal assembly 101'. Valve seat 30' comprises sealing surface 33'. Valve body and seal assembly 101' comprises a stem-guided valve body 20' having a characteristic Channel-Beam shape and an elastomeric seal 40' in a peripheral integral seal retention groove 26'. Valve body 20' comprises guide stem 21' and a plurality of valve guide feet 18 lying within open valve seat 30', guide feet 18 being guided by cylindrical sidewall 32' of valve seat 30'. Valve body 20' also comprises Channel-Beam 27' (analogous to flange 27 in FIG. 1B), which in turn comprises first and second groove walls 28' and 29' respectively of peripheral integral seal retention groove 26'. First groove wall 28' is near peripheral metal sealing surface 23' (valve body impact area) of valve body 20'. When valve 10' closes, sealing surface 23' of valve body 20' strikes sealing surface 33' of open seat 30', causing relatively high impact stress in sealing surface 23' and adjacent areas of the periphery of first seal retention groove wall 28'.

FIG. 2 schematically illustrates an enlarged partial cross-section of valve body 20 as shown in FIG. 1B but without seal 40. Serration group 25 is shown offset peripherally a distance D from serration group 24. Serration group 24 on first groove wall 28 of peripheral integral seal retention groove 26 is located as far centrally as practicable (i.e., as close to the longitudinal axis of symmetry x-x of valve body 20 as practicable). Conversely, serration group 25 on second groove wall 29 is located as far peripheral as practicable (i.e., as far from the longitudinal axis of symmetry x-x of valve body 20 as practicable). Distance D represents the difference in the mean of distances measured from the longitudinal axis x-x to serrations in serration group 25, minus the mean of distances measured from the longitudinal axis x-x to serrations in serration group 24.

Figure 3:
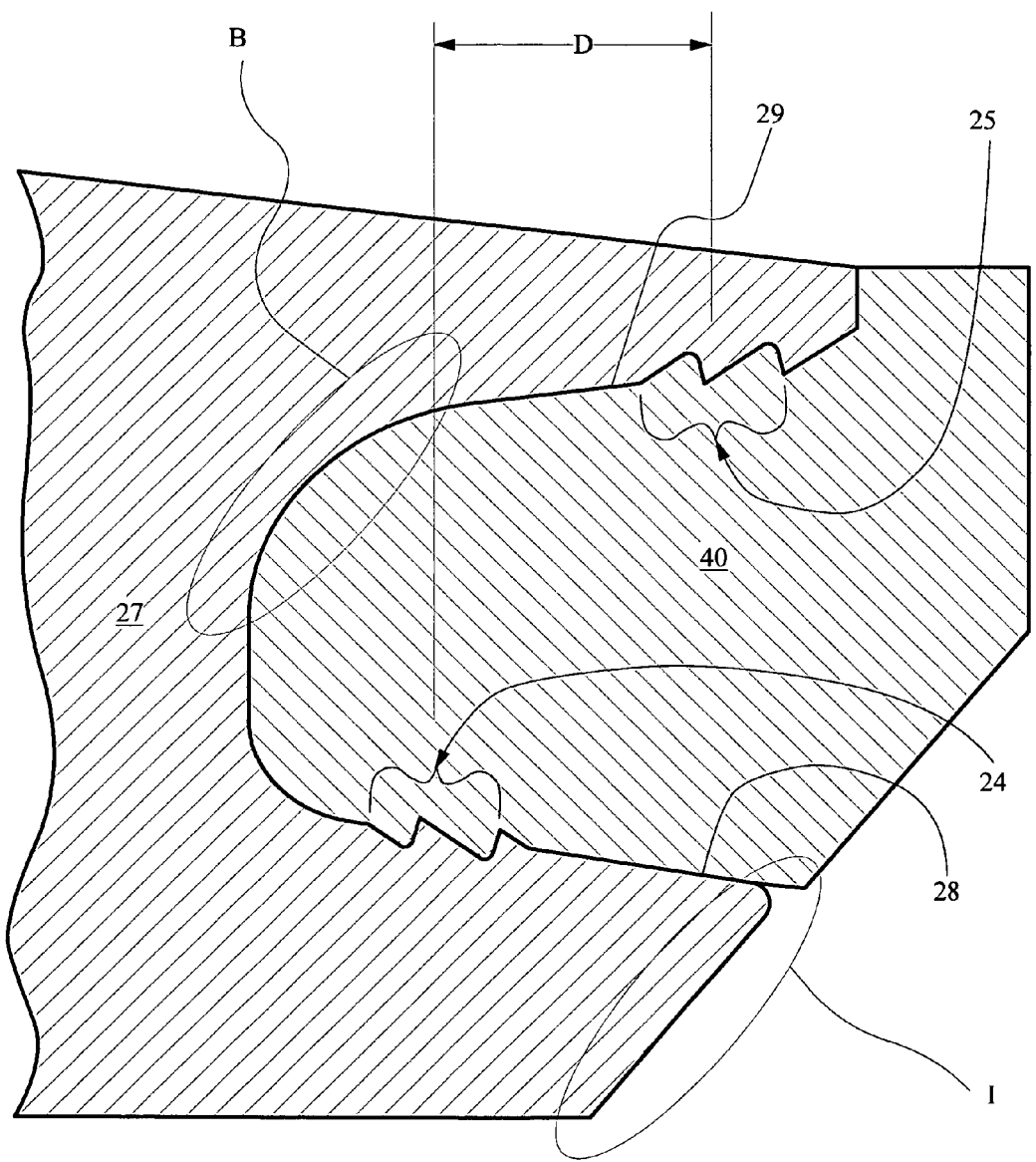
FIG. 3 schematically illustrates an enlarged view of a peripheral integral seal retention groove section similar to that shown in FIGS. 1B and 2, indicating areas of maximum impact stress and maximum bending stress.

FIG. 3 schematically illustrates an enlargement of the partial cross-section of valve body 20 shown in FIG. 1B. In addition to showing serration group 25 offset peripherally a distance D from serration group 24, FIG. 3 shows areas of peripheral integral seal retention groove 26 which are subjected to high bending stress (area B), as well as areas of groove 26 which are subjected to high impact stress (area I).

Note that placement of serration group 24 centrally is limited because the serrations must resist movement of seal 40 out of groove 26. This is best accomplished if serration group 24 is located on the relatively straight part of groove wall 28 as far central as this straight part extends. Similarly, serration group 25 is preferably located peripherally on the relatively straight part of groove wall 29. Any offset greater than zero between serration groups 24 and 25 confers a benefit by reducing bending and/or impact stress in flange 27 relative to earlier cited valve designs.

The depth of serrations in groups 24 and 25 is predetermined in light of shrinkage anticipated during curing of elastomeric seal 40 so that after maximal shrinkage, seal 40 will remain effectively interdigitated with serration groups 24 and 25. Effective interdigitation is the minimum interdigitation required to prevent movement of seal 40 within groove 28 that would lead to premature failure of the valve. As a general guide, assuming elastomer shrinkage of about 2% during curing, the height of a given serration is preferably 5% to 15% of the shortest distance between groove walls 28 and 29 as measured at the given serration.

Note that a serration height equal to 5% of the distance between groove walls, when combined with 2% elastomer shrinkage on curing, means there is a minimum overlap of serrations with elastomer of approximately 3% of the distance between groove walls. Further, the cured elastomeric seal, although shrunk, remains interdigitated with the serrations for greater than half of their predetermined height. For relatively less severe service conditions, this overlap may constitute sufficient interdigitation of serrations and elastomer to retain the seal in proper position in the groove. For more severe service conditions, overlap of approximately 13% (obtained with a serration height of approximately 15% of the distance between groove walls) may be needed to retain the seal in proper position. In this latter case, the cured elastomeric seal remains interdigitated with said serrations for greater than 86% of the predetermined height. But note also that as serration height increases, internal stress concentration in the seal elastomer also increases. Thus, service conditions must be considered in light of elastomer properties to determine the serration height for greatest service life or least life-cycle cost in any particular application.

Figure 4:
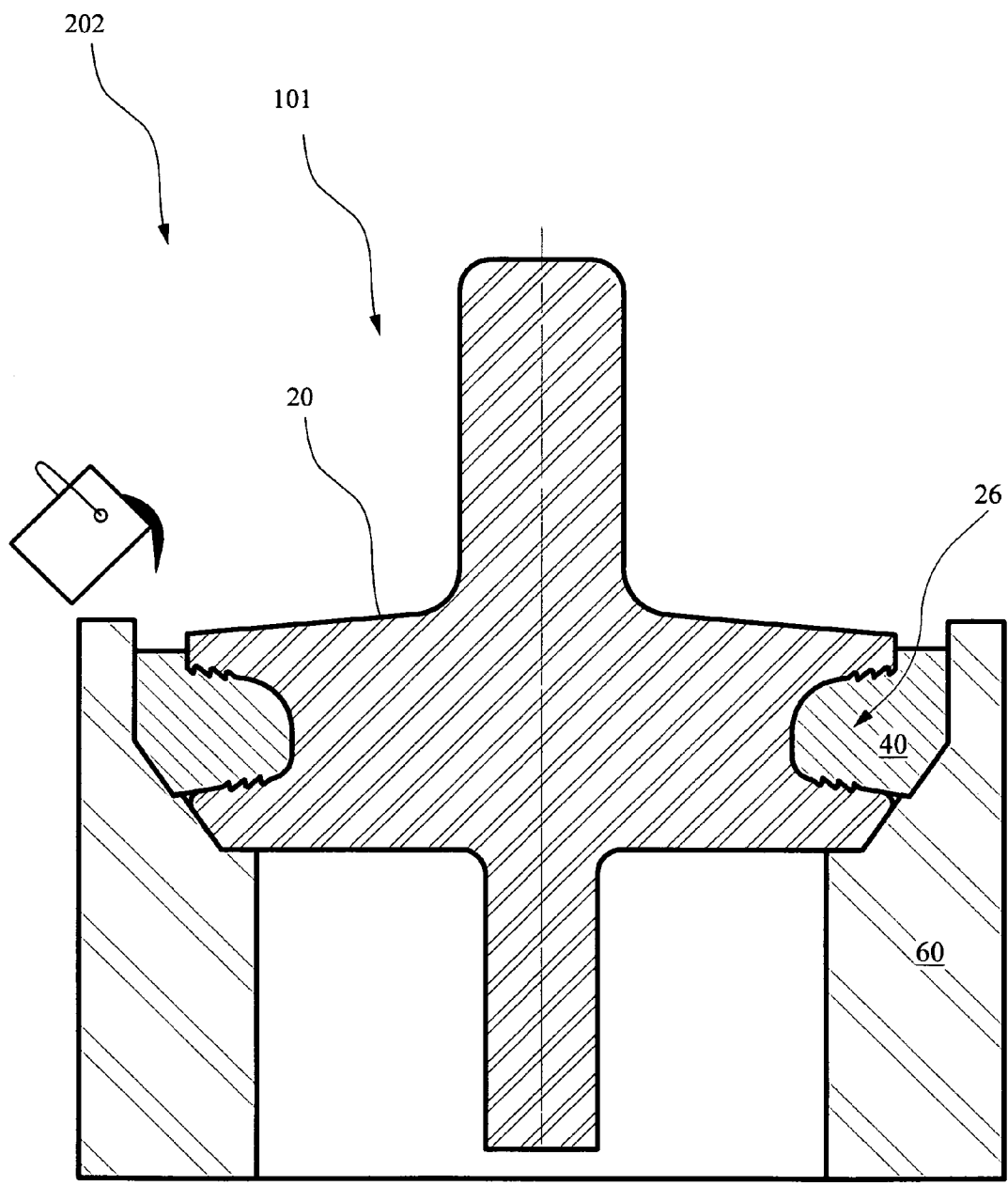
FIG. 4 schematically illustrates a cross-section showing casting-in-place of a single-durometer elastomeric seal in a mold comprising a mold shell mated with a peripheral integral seal retention groove of a valve body.

FIG. 4 schematically illustrates a mold 202 comprising a peripheral integral seal retention groove 26 of a valve body 20 (see also FIG. 1B). Mold 202 also comprises mold shell 60, which mates with valve body 20. In use, mold shell 60 is temporarily mated with valve body 20 to form mold 202. Liquid elastomer (liquid urethane for example) is poured into mold 202 and cured therein to form a single-durometer cast-in-place elastomeric seal 40. During curing of seal 40, normal shrinkage of the elastomer takes place without appreciable adhesion of seal 40 to surfaces of mold 202 because these are adhesion-inhibiting surfaces. After seal 40 is cured, mold shell 60 will be removed, leaving a single-durometer valve body and seal assembly 101. Only minor machining of seal 40 may be required after removal of mold shell 60.

Figure 5:
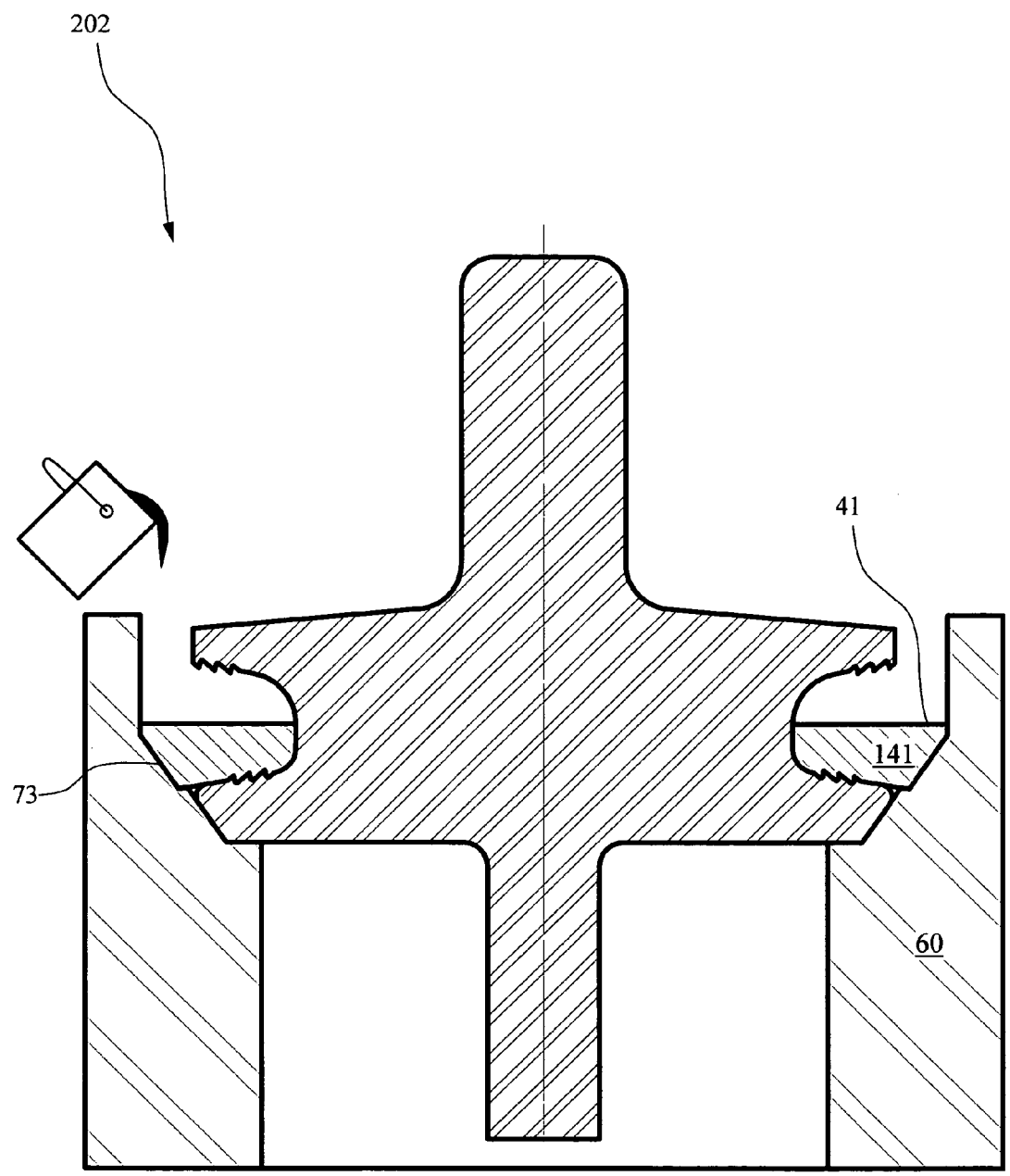
FIG. 5 schematically illustrates a cross-section showing a cast-in-place first section of a dual-durometer elastomeric seal in a mold analogous to the mold shown in FIG. 4; a second liquid elastomer is shown being pored for casting-in-place a second section of a dual-durometer elastomeric seal.

FIG. 5 schematically illustrates a cross-section showing a cast-in-place first section 41 of a dual-durometer elastomeric seal 45 (see FIG. 6) in a mold 202 (analogous to mold 202 shown in FIG. 4). After casting-in-place second seal section 42 in a manner analogous to that illustrated in FIG. 5, followed by removal of the mold shell 60, a dual-durometer valve body and seal assembly 105 of the present invention is produced as schematically illustrated in FIG. 6.

Figure 6:
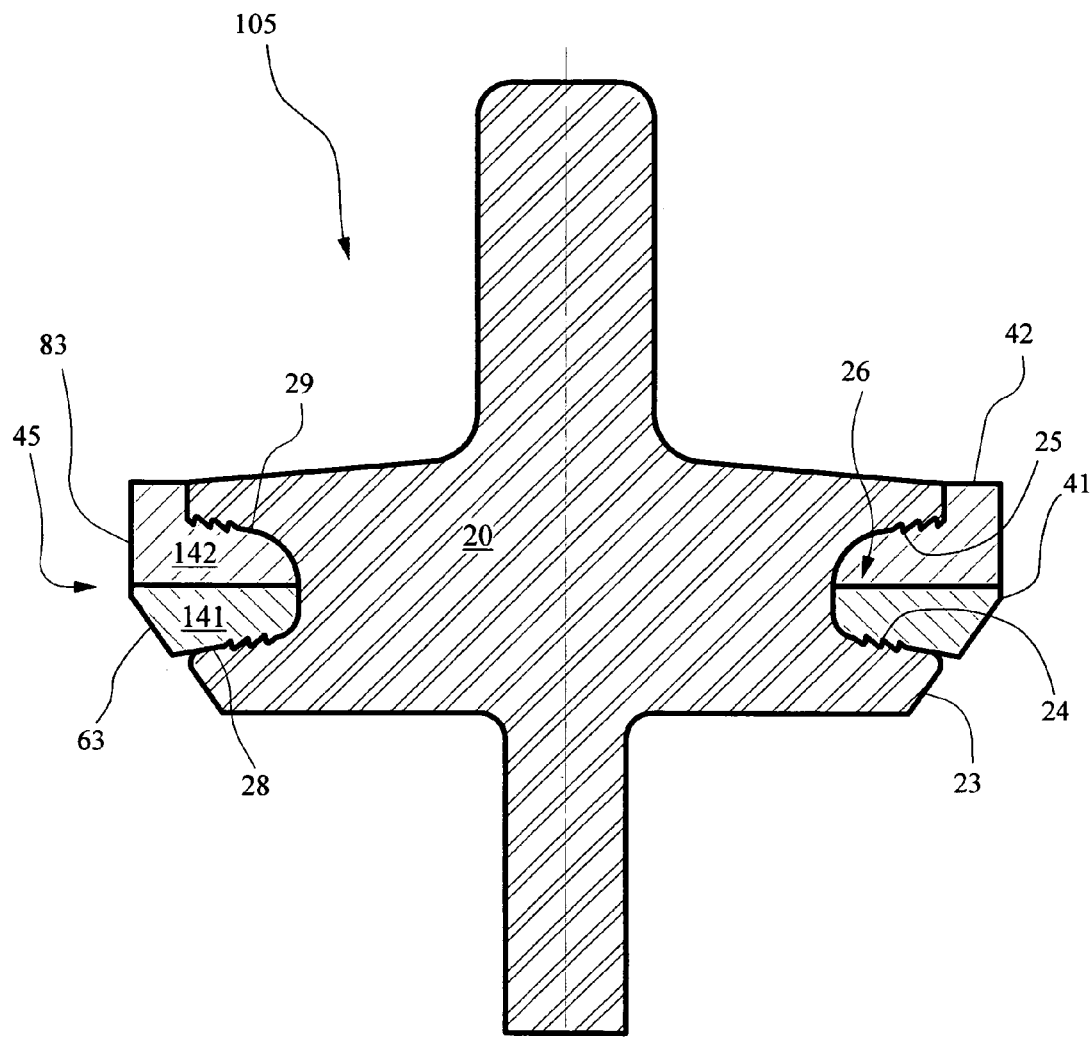
FIG. 6 schematically illustrates a cross-section showing, after removal of the mold shell shown in FIG. 5, a cured dual-durometer elastomeric seal that has been cast-in-place on a valve body comprising a peripheral seal retention groove.

Specifically, FIG. 6 schematically illustrates a (dual-durometer) valve body and seal assembly 105 having a longitudinal axis of symmetry and comprising a peripheral seal retention groove 26 spaced apart from the longitudinal axis. Seal retention groove 26 has first and second opposing groove walls 28 and 29 respectively. A valve body impact area 23 for contacting a valve seat is peripherally located on first opposing groove wall 28 of peripheral seal retention groove 26, and circular serrations 24 and 25 are located on the first and second opposing groove walls 28 and 29 respectively of peripheral seal retention groove 26. An elastomeric seal 45 is cast-in-place in peripheral seal retention groove 26, and elastomeric seal 45 comprises a first seal section 41 and a second seal section 42. First seal section 41 comprises a peripheral frusto-conical surface 63 for contacting a valve seat, frusto-conical surface 63 being adjacent to the valve body impact area 23. And first seal section 41 comprises relatively high modulus polyurethane 141. Second seal section 42 comprises a peripheral surface 83 adjacent to peripheral frusto-conical surface 63, at least a portion of second seal section 42 comprising polyurethane 142 having a lower modulus than the relatively high modulus polyurethane 141 of first seal section 41.

The present invention includes a method of making a (dual-durometer) valve body and seal assembly 105 comprising a seal 45 having first and second seal sections 41 and 42 respectively. The method comprises providing first and second liquid elastomers 141 and 142 respectively of different composition for casting first and second seal sections 41 and 42 respectively. A valve body 20 having a longitudinal axis is provided, valve body 20 comprising a peripheral seal retention groove 26 spaced apart from the longitudinal axis. Seal retention groove 26 has first and second opposing groove walls 28 and 29 and an impact area 23 for contacting a valve seat, impact area 23 being peripherally located on first opposing groove wall 28 of peripheral seal retention groove 26. Circular serrations 24 and 25 are located on first and second opposing groove walls 28 and 29 respectively of peripheral seal retention groove 26. A mold 202 is provided for containing liquid elastomers 141 and 142, mold 202 comprising a mold shell 60 mated with valve body 20. Mold shell 60 comprises a frusto-conical portion 73 for forming a frusto-conical surface 63 on first seal section 41 for contacting a valve seat, the frusto-conical portion 73 of mold shell 60 being adjacent to impact area 23 of valve body 20. The first liquid elastomer 141 is poured into mold 202 to form first seal section 41 comprising frusto-conical surface 63, and the second liquid elastomer 142 is then poured into mold 202 to form second seal section 42. The poured first and second elastomers 141 and 142 respectively are cured in mold 202, and mold shell 60 is then removed to make a (dual-durometer) valve body and seal assembly 105.

What is claimed is:

1. A valve body and seal assembly having a longitudinal axis of symmetry and comprising:
   a peripheral seal retention groove spaced apart from the longitudinal axis, said seal retention groove having first and second opposing groove walls;
   a valve body impact area for contacting a valve seat, said impact area being peripherally located on said first opposing groove wall of said peripheral seal retention groove;
   circular serrations on said first and second opposing groove walls of said peripheral seal retention groove; and
   an elastomeric seal cast-in-place in said peripheral seal retention groove, said elastomeric seal comprising:
      a first seal section comprising a peripheral frusto-conical surface for contacting a valve seat, said frusto-conical surface being adjacent to said valve body impact area and said first seal section comprising relatively high modulus polyurethane; and
      a second seal section comprising a peripheral surface adjacent to said peripheral frusto-conical surface, at least a portion of said second seal section comprising polyurethane having a lower modulus than said relatively high modulus polyurethane.

2. The valve body and seal assembly of claim 1, wherein said first opposing groove wall circular serrations are offset nearer said valve body longitudinal axis than said second groove wall circular serrations.

3. The valve body and seal assembly of claim 1, wherein said first seal section has greater extrusion resistance than said second seal section.

4. The valve body and seal assembly of claim 1, wherein said first seal section comprises MDI urethane.

5. The valve body and seal assembly of claim 1, wherein said first seal section comprises urethane of about 95 durometer Shore A hardness.

6. The valve body and seal assembly of claim 1, wherein said second seal section comprises urethane of about 75 to about 85 durometer Shore A hardness.

7. A valve comprising the valve body and seal assembly of claim 1 and a valve seat.

* * * * *